US011526599B2

(12) United States Patent
Kudo et al.

(10) Patent No.: US 11,526,599 B2
(45) Date of Patent: Dec. 13, 2022

(54) CLUSTERED APPLICATION POLICY GENERATION

(71) Applicant: International Business Machines Corporation, Armonk, NY (US)

(72) Inventors: Ruriko Kudo, Tokyo (JP); Hirokuni Kitahara, Tokyo (JP); Kugamoorthy Gajananan, Tokyo (JP); Yuji Watanabe, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 87 days.

(21) Appl. No.: 17/233,593

(22) Filed: Apr. 19, 2021

(65) Prior Publication Data
US 2022/0335119 A1     Oct. 20, 2022

(51) Int. Cl.
| G06F 21/53 | (2013.01) |
| G06F 21/31 | (2013.01) |
| G06F 21/57 | (2013.01) |
| G06F 21/54 | (2013.01) |

(52) U.S. Cl.
CPC .............. *G06F 21/53* (2013.01); *G06F 21/31* (2013.01); *G06F 21/54* (2013.01); *G06F 21/57* (2013.01)

(58) Field of Classification Search
CPC .......... G06F 21/53; G06F 21/31; G06F 21/54; G06F 21/57
See application file for complete search history.

(56) References Cited

U.S. PATENT DOCUMENTS

| 11,196,628 | B1* | 12/2021 | Shen .................. H04L 43/026 |
| 2015/0256341 | A1* | 9/2015 | Ye ........................ H04L 63/00 |
| | | | 713/164 |
| 2017/0351862 | A1* | 12/2017 | Mohinder ............ G06F 21/57 |
| 2019/0332777 | A1* | 10/2019 | Edwards ................ H04L 9/14 |
| 2020/0167473 | A1* | 5/2020 | Polyakov ............. G06F 21/54 |
| 2020/0257810 | A1* | 8/2020 | Vrabec .................. H04L 63/20 |
| 2020/0285761 | A1* | 9/2020 | Buck .................... G06F 21/62 |
| 2021/0055927 | A1* | 2/2021 | Sarukkai ................. G06F 8/71 |
| 2021/0067512 | A1* | 3/2021 | Polepalli Yeshwanth ................. H04L 63/10 |

FOREIGN PATENT DOCUMENTS

CN            110753119 A      2/2020

OTHER PUBLICATIONS

"Certificate Signing Requests", Dec. 24, 2020, 9 pages, <https://kubernetes.io/docs/reference/access-authn-authz/certificate-signing-requests/>.

(Continued)

*Primary Examiner* — Beemnet W Dada
(74) *Attorney, Agent, or Firm* — Randy E. Tejeda

(57) ABSTRACT

One or more computer processors collect logs containing one or more admission requests associated with a new application installation in an empty namespace, wherein the empty namespace is a sandbox representative of a production environment. The one or more computer processors classify the one or more admission requests according to a set of conditions indicating respective levels of trust. The one or more computer processors create a set of candidates for signing containing admissions requests that are classified unsigned. The one or more computer processors generate a security policy for each candidate for signing in the set of candidates for signing.

20 Claims, 3 Drawing Sheets

(56) References Cited

OTHER PUBLICATIONS

"Install existing applications with Helm in Azure Kubernetes Service (AKS)", Dec. 7, 2020, 5 pages, <https://docs.microsoft.com/en-us/azure/aks/kubernetes-helm>.
"Kubernetes", Dec. 28, 2020, 6 pages, <https://cert-manager.io/docs/installation/kubernetes/>.
Ahmed, Mohamed, "Deploying An Application on Kubernetes From A to Z", Apr. 14, 2020, 21 pages, <https://www.magalix.com/blog/deploying-an-application-on-kubernetes-from-a-to-z>.
Baer et al., "Using logging for your apps running on Kubernetes Engine", May 11, 2020, 10 pages, <https://cloud.google.com/blog/products/management-tools/using-logging-your-apps-running-kubernetes-engine>.
Vaswani, Vikram, "Deploy, Scale and Upgrade an Application on Kubernetes with Helm", Dec. 24, 2020, 10 pages, <https://docs.bitnami.com/tutorials/deploy-application-kubernetes-helm/>.
Vaswani, Vikram, "Install and Use Kubeapps with the Bitnami Kubernetes Sandbox", Dec. 28, 20, 5 pages, <https://docs.bitnami.com/tutorials/install-use-kubeapps/>.

\* cited by examiner

CLUSTERED APPLICATION POLICY GENERATION

BACKGROUND

The present invention relates generally to the field of virtualization, and more particularly to container-orchestration.

Container-orchestraters (i.e., Kubernetes) define a set of building blocks, which collectively provide mechanisms that deploy, maintain, and scale applications based on CPU, memory, or custom metrics. Container-orchestraters are loosely coupled and extensible to meet different workloads. This extensibility is provided in large part by the container-orchestraters application programming interface (API), which is used by internal components as well as extensions and containers.

SUMMARY

Embodiments of the present invention disclose a computer-implemented method, a computer program product, and a system. The computer-implemented method includes one or more computer processors collecting logs containing one or more admission requests associated with a new application installation in an empty namespace, wherein the empty namespace is a sandbox representative of a production environment. The one or more computer processors classify the one or more admission requests according to a set of conditions indicating respective levels of trust. The one or more computer processors create a set of candidates for signing containing admissions requests that are classified unsigned. The one or more computer processors generate a security policy for each candidate for signing in the set of candidates for signing.

DETAILED DESCRIPTION

Containers and container-orchestraters continue to dominate information technology, specifically application deployments and microservice implementation. Regulated information technology systems, especially in government and financial industries, are exponentially migrating from on-premises to cloud clusters. The majority of application are deployed to clusters of containers managed by container-orchestraters. Here, container-orchestraters manage the lifecycles of containers in large, dynamic environments. Container-orchestraters provide deployment, provisioning, redundancy, and availability of containers. Container-orchestraters also provide basic security through an admission controller. However, container-orchestraters have significant deficiencies. Frequently, users attempt to install new resources (i.e., deployment or service) to a cluster and said resources are rejected by a default admission controller unless all of the resources are signed correctly. Installation failures due to unsigned resources waste computational resources, computational time, and require direct user intervention. Moreover, it is difficult and at times impossible for the user to know which resource should be signed before an installation attempt. These issues are amplified due to the use of yaml files, especially yaml files generated by common templating engines, especially in highly regulated workloads, where it is important to protect configuration integrity of deployed applications.

Embodiments of the present invention improve container-orchestration by identifying resources that required to be sign, automatically, generating, and implementing policies allowing the application to install or update without human intervention while retaining strict cluster security requirements. Embodiments of the present invention improve container-orchestration by ensuring that applications are successfully installed by generating policies that allow specific resources to be signed before fatal installation errors occur in a secure and empty namespace (i.e., sandbox). Implementation of embodiments of the invention may take a variety of forms, and exemplary implementation details are discussed subsequently with reference to the Figures.

The present invention will now be described in detail with reference to the Figures.

Figure 1:
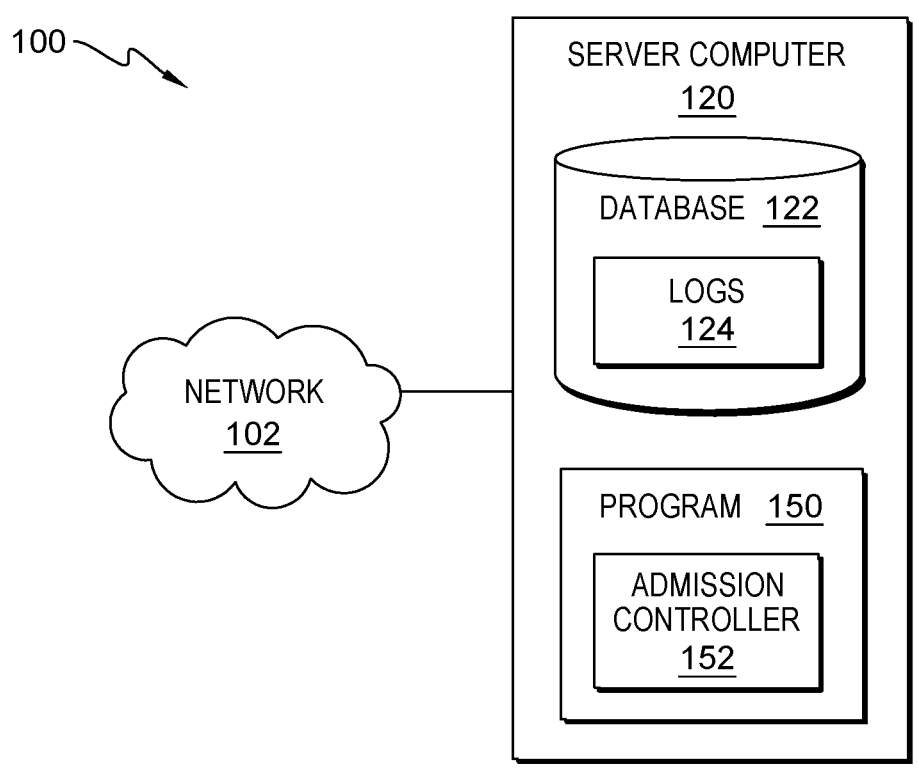
FIG. 1 is a functional block diagram illustrating a computational environment, in accordance with an embodiment of the present invention.

FIG. 1 is a functional block diagram illustrating a computational environment, generally designated 100, in accordance with one embodiment of the present invention. The term "computational" as used in this specification describes a computer system that includes multiple, physically, distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computational environment 100 includes server computer 120 connected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between server computer 120, and other computing devices (not shown) within computational environment 100. In various embodiments, network 102 operates locally via wired, wireless, or optical connections and can be any combination of connections and protocols (e.g., personal area network (PAN), near field communication (NFC), laser, infrared, ultrasonic, etc.).

Server computer 120 can be a standalone computing device, a management server, a web server, a mobile computing device, or any other electronic device or computing system capable of receiving, sending, and processing data. In other embodiments, server computer 120 can represent a server computing system utilizing multiple computers as a server system, such as in a cloud computing environment. In another embodiment, server computer 120 can be a laptop computer, a tablet computer, a netbook computer, a personal computer (PC), a desktop computer, a personal digital assistant (PDA), a smart phone, or any programmable electronic device capable of communicating with other computing devices (not shown) within computational environment 100 via network 102. In another embodiment, server computer 120 represents a computing system utilizing clustered computers and components (e.g., database server computers, application server computers, etc.) that act as a single pool of seamless resources when accessed within computational environment 100. In the depicted embodiment, server computer 120 includes database 122, program 150, and admission controller 152. In other embodiments, server computer 120 may contain other applications, databases, programs, etc. which have not been depicted in computational environment 100. Server computer 120 may include internal and external hardware components, as depicted and described in further detail with respect to FIG. 3.

Database 122 is a repository for data used by program 150. In the depicted embodiment, database 122 resides on server computer 120. In another embodiment, database 122 may reside elsewhere within computational environment 100 provided program 150 has access to database 122. A database is an organized collection of data. Database 122 can be implemented with any type of storage device capable of storing data and configuration files that can be accessed and utilized by program 150, such as a database server, a hard disk drive, or a flash memory. In the depicted embodiment, database 122 contains logs 124. Logs 124 contains records of all requests made to admission controller 152 through one or more application installations and subsequent resources creation or update admission requests.

Program 150 is a program for dynamic container-orchestration policy generation. In various embodiments, program 150 may implement the following steps: collect logs containing one or more admission requests associated with a new application installation in an empty namespace, wherein the empty namespace is a sandbox representative of a production environment; classify the one or more admission requests according to a set of conditions indicating respective levels of trust; create a set of candidates for signing containing admissions requests that are classified unsigned; and generate a security policy for each candidate for signing in the set of candidates for signing. In the depicted embodiment, program 150 is a standalone software program. In another embodiment, the functionality of program 150, or any combination programs thereof, may be integrated into a single software program. In some embodiments, program 150 may be located on separate computing devices (not depicted) but can still communicate over network 102. In various embodiments, client versions of program 150 resides on any other computing device (not depicted) within computational environment 100. Program 150 is depicted and described in further detail with respect to FIG. 2.

Admission controller 152 is a plugin or application that governs and enforces how a cluster is used. Admission controller 152 is a gatekeeper that intercepts API requests and, responsively, may change the request object or deny the request altogether. Admission controllers must be enabled to use some of the more advanced security features of Kubernetes, such as pod security policies that enforce a security configuration baseline across an entire namespace. Admission controller 152 increases cluster security by mandating a reasonable security baseline across an entire namespace or cluster. For example, admission controller 152 disallows containers from running as root. In an embodiment, admission controller 152 allows pulling images only from specific registries known to the enterprise, while denying unknown image registries; rejects deployments that do not meet security standard; enforces good labels, annotations, resource limits, or other settings; and validates configuration of the objects running in the cluster. In an embodiment, admission controller 152 validates admission requests and resources by analyzing a signature and signature message attached to the resource.

The present invention may contain various accessible data sources, such as database 122, that may include personal storage devices, data, content, or information the user wishes not to be processed. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. Program 150 provides informed consent, with notice of the collection of personal data, allowing the user to opt in or opt out of processing personal data. Consent can take several forms. Opt-in consent can impose on the user to take an affirmative action before the personal data is processed. Alternatively, opt-out consent can impose on the user to take an affirmative action to prevent the processing of personal data before the data is processed. Program 150 enables the authorized and secure processing of user information, such as tracking information, as well as personal data, such as personally identifying information or sensitive personal information. Program 150 provides information regarding the personal data and the nature (e.g., type, scope, purpose, duration, etc.) of the processing. Program 150 provides the user with copies of stored personal data. Program 150 allows the correction or completion of incorrect or incomplete personal data. Program 150 allows the immediate deletion of personal data.

Figure 2:
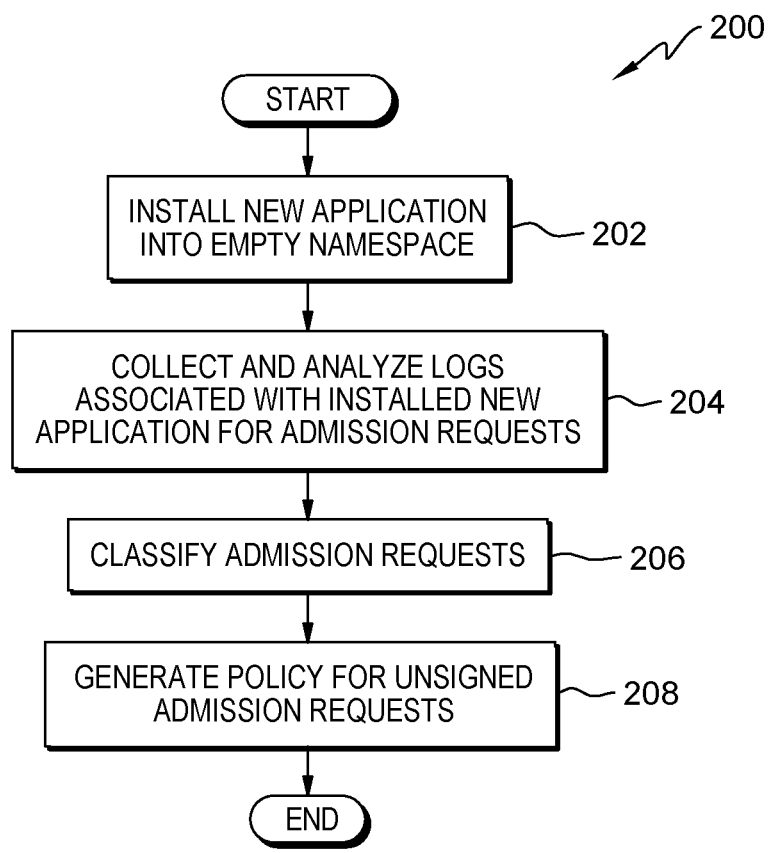
FIG. 2 is a flowchart depicting operational steps of a program, on a server computer within the computational environment of FIG. 1, for dynamic container-orchestration policy generation, in accordance with an embodiment of the present invention.

FIG. 2 depicts flowchart 200 illustrating operational steps of program 150 for dynamic container-orchestration policy generation, in accordance with an embodiment of the present invention.

Program 150 installs a new application into an empty namespace (step 202). In an embodiment, program 150 initiates responsive to a new application (i.e., one or more resources, a group of resources, etc.) or updated application requesting installation on a managed cluster of containers, where the new application is installed from a yaml file or a package manager system (i.e., charts). Here, resources contained and designated by the yaml file are frequently different than the resources created responsively by the container-orchestrator, therefore users do not know beforehand what resources are generated and whether the container-orchestrated resources are the same as the resource to be signed, where signed resources are validated and protected by a digital signature. Further, the resource (i.e., resource object) designated in the application installation (e.g., admission request for resource creation) is different from the original resource which is signed by user due to fields that are modified internally by the platform (e.g., Kubernetes). Responsively, program 150 suspends the new application installation until a policy is generated and implemented. In another embodiment, program 150 reroutes the application installation onto an empty namespace (i.e., sandbox or virtual cluster) and collects resulting admission logs (i.e., logs 124) from admission controller 152. In an embodiment, the empty namespace is a replica of a production environment but with reduced security policies (e.g., allow all requests (i.e., unsigned or signed)) or admission criteria.

Program 150 collects logs associated with the installed application for admission requests (step 204). In an embodiment, program 150 monitors the installation of the application, collects logs from one or more application programming interface (API) (e.g., admission requests) made to admission controller 152 during the installation process, and stores the collected logs into logs 124. Responsively, program 150 adds an unverified annotation or tag to admission requests that would normally be blocked due to implemented security policies, precautions (e.g., no signature requests), or associated unsigned resource status/tag.

Program 150 classifies the admission requests (step 206). Responsive to the monitored installation, program 150 analyzes and classifies the admission requests tagged with an unverified annotation contained in logs 124 made to admission controller 152 as a signed admission request (e.g., resource creation request, resource update request, etc.) according to a set of conditions indicating respective levels of trust (e.g., signed vs unsigned), such as a valid signature, trusted platform (i.e., Kubernetes), verified owners and verified users (e.g., service account), trusted user operation as defined in a policy, a signed resource, and a whitelisted resource update, while classifying the remaining admission requests as unsigned (i.e., candidate for signing). In an embodiment, admission requests are initiated, requested, or operated by a plurality of different entities such as users, application installers, platform users, and unknown entities. In this embodiment, program 150 identifies an entity associated with each request, where each entity is associated with a security policy. For example, program 150 identifies a user associated with an admission request, determines whether said user is a trusted user dictated by a policy, and classifies the admission request as a signed request. In this example, program 150 responsively approves associated images, containers, and resources. In another example, an admission request is created (e.g., resourced created or updated) by a trusted user and owned by a trusted owner, thus program 150 classifies the request as an allowed request. In another embodiment, program 150 classifies an admission request as allowed if a resulting resource matches a resource contained in a trusted package manager or signed package. In another embodiment, program 150 compares the admission request to historical signed resources and associated admission requests in order to determine a classification of said admission request. In yet another embodiment, program 150 compares a hash value associated with an update request with a hash value as the create request. Here, if the hash values match then program 150 classifies the admission request as a signed (e.g., approved) request. Responsive to an unclassified admission request (e.g., admission request associated with an unknown entity), program 150 classifies said admission request as an unsigned request.

Program 150 generates a policy for unsigned admission requests (step 208). In an embodiment, program 150 creates a set of candidates for subsequent signing consisting of every unsigned request classified in step 206. In this embodiment, the set of candidates would delay, suspend, or halt an associated application installation into a production cluster with implemented security policies, such as denying API access to unsigned resources or resources associated with unknown entities. Responsive to the created set, program 150 identifies a request intent for each admission request in the created set that dictates whether the admission request is a resource creation (i.e., create request) or resource update (i.e., update request). Responsive to a create request, program 150 identifies a difference between information of the resource included in the associated admission request and information of a resource created by the installation. Program 150 generates and implements a policy to exclude changed information. For example, program 150 identifies a difference between a signature message associated with the admission request and a created cluster resource. Here, program 150 generates and implements a security policy to exclude (e.g., ignore) changed parts from the signature message. Responsive to an update request, program 150 identifies a difference between a resource before and after the update. Here, program 150 generates and implements a security policy (e.g., allow list) to allow changes to the identified differences. In an embodiment, program 150 generates and implements a policy that removes portions that are divergent between a yaml file resource and a created resource by a container orchestrator. In an embodiment, program 150 includes automatically modified fields associated with the added by the container orchestrator or platform into the policy. In another embodiment, program 150 implements admission request webhooks in response to a generated policy. In this embodiment, webhooks are either validating or mutating. Here, mutating admission webhooks modify requests sent to the API server to enforce custom policies and validating admission webhooks reject requests to enforce custom policies. Responsively, program 150 initiates or unsuspends the new application installation into a production cluster or environment with updated policies.

Figure 3:
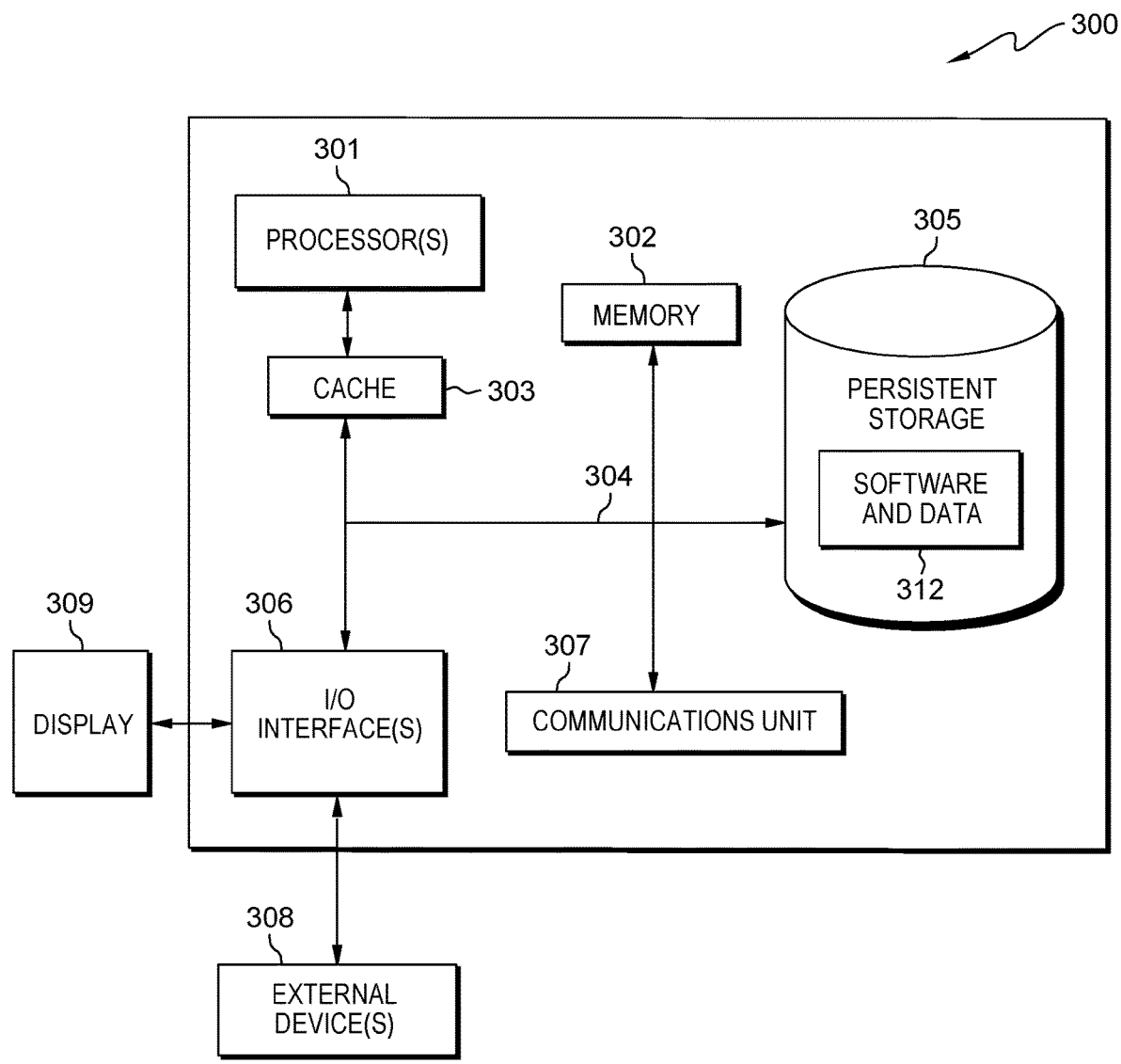
FIG. 3 is a block diagram of components of the server computer, in accordance with an embodiment of the present invention.

FIG. 3 depicts block diagram 300 illustrating components of server computer 120 in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Server computer 120 each include communications fabric 304, which provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications, and network processors, etc.), system memory, peripheral devices, and any other hardware components within a system. For example, communications fabric 304 can be implemented with one or more buses or a crossbar switch.

Memory 302 and persistent storage 305 are computer readable storage media. In this embodiment, memory 302 includes random access memory (RAM). In general, memory 302 can include any suitable volatile or non-volatile computer readable storage media. Cache 303 is a fast memory that enhances the performance of computer processor(s) 301 by holding recently accessed data, and data near accessed data, from memory 302.

Program 150 may be stored in persistent storage 305 and in memory 302 for execution by one or more of the respective computer processor(s) 301 via cache 303. In an embodiment, persistent storage 305 includes a magnetic hard disk drive. Alternatively, or in addition to a magnetic hard disk drive, persistent storage 305 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305. Software and data 312 can be stored in persistent storage 305 for access and/or execution by one or more of the respective processors 301 via cache 303.

Communications unit 307, in these examples, provides for communications with other data processing systems or devices. In these examples, communications unit 307 includes one or more network interface cards. Communications unit 307 may provide communications through the use of either or both physical and wireless communications links. Program 150 may be downloaded to persistent storage 305 through communications unit 307.

I/O interface(s) 306 allows for input and output of data with other devices that may be connected to server computer 120. For example, I/O interface(s) 306 may provide a connection to external device(s) 308, such as a keyboard, a keypad, a touch screen, and/or some other suitable input device. External devices 308 can also include portable computer readable storage media such as, for example, thumb drives, portable optical or magnetic disks, and memory cards. Software and data used to practice embodiments of the present invention, e.g., program 150, can be stored on such portable computer readable storage media and can be loaded onto persistent storage 305 via I/O interface(s) 306. I/O interface(s) 306 also connect to a display 309.

Display 309 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, conventional procedural programming languages, such as the "C" programming language or similar programming languages, and quantum programming languages such as the "Q" programming language, Q #, quantum computation language (QCL) or similar programming languages, low-level programming languages, such as the assembly language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
    collecting, by one or more computer processors, logs containing one or more admission requests associated with a new application installation in an empty namespace, wherein the empty namespace is a sandbox representative of a production environment;
    classifying, by one or more computer processors, the one or more admission requests according to a set of conditions indicating respective levels of trust;
    creating, by one or more computer processors, a set of candidates for signing containing admissions requests that are classified unsigned; and
    generating, by one or more computer processors, a security policy for each candidate for signing in the set of candidates for signing.

2. The computer-implemented method of claim 1, further comprising:
    identifying, by one or more computer processors, a request intent for each candidate for signing in the set of candidates for signing, wherein the request intent dictates whether the candidate for signing is the admission request for a resource creation or the admission request for a resource update.

3. The computer-implemented method of claim 2, further comprising:
    responsive to identifying the request intent for the resource creation, identifying, by one or more computer processors, a difference between information of the resource included in the candidate for signing and information of the resource created by the new application installation; and
    generating, by one or more computer processors, the security policy to exclude the difference.

4. The computer-implemented method of claim 2, further comprising:
    responsive to identifying the request intent for the resource update, identifying, by one or more computer processors, a difference between the resource before the resource update and after the resource after the resource update; and
    generating, by one or more computer processors, the security policy to allow the identified difference.

5. The computer-implemented method of claim 1, wherein collecting logs containing the one or more admission requests associated with the new application installation in the empty namespace, wherein the empty namespace is the sandbox representative of the production environment, comprises:
    suspending, by one or more computer processors, the new application into the production environment.

6. The computer-implemented method of claim 1, further comprising:
    implementing, by one or more computer processors, the generated security policy into the production environment; and
    installing, by one or more computer processors, the new application into the production environment.

7. The computer-implemented method of claim 1, wherein the set of conditions include a first condition that the admission request is from a trusted platform, a second condition that the admission request is created by a trusted user or trusted owner of a resource, and a third condition that the admission request is for a signed resource.

8. The computer-implemented method of claim 7, wherein the trusted platform is Kubernetes.

9. A computer program product comprising:
    one or more computer readable storage media and program instructions stored on the one or more computer readable storage media, the stored program instructions comprising:
    program instructions to collect logs containing one or more admission requests associated with a new application installation in an empty namespace, wherein the empty namespace is a sandbox representative of a production environment;
    program instructions to classify the one or more admission requests according to a set of conditions indicating respective levels of trust;
    program instructions to create a set of candidates for signing containing admissions requests that are classified unsigned; and
    program instructions to generate a security policy for each candidate for signing in the set of candidates for signing.

10. The computer program product of claim 9, wherein the program instructions, stored on the one or more computer readable storage media, further comprise:

program instructions to identify a request intent for each candidate for signing in the set of candidates for signing, wherein the request intent dictates whether the candidate for signing is the admission request for a resource creation or the admission request for a resource update.

11. The computer program product of claim 10, wherein the program instructions, stored on the one or more computer readable storage media, further comprise:
program instructions to, responsive to identifying the request intent for the resource creation, identify a difference between information of the resource included in the candidate for signing and information of the resource created by the new application installation; and
program instructions to generate the security policy to exclude the difference.

12. The computer program product of claim 10, wherein the program instructions, stored on the one or more computer readable storage media, further comprise:
program instructions to, responsive to identifying the request intent for the resource update, identify a difference between the resource before the resource update and after the resource after the resource update; and
program instructions to generate the security policy to allow the identified difference.

13. The computer program product of claim 10, wherein the program instructions, collect to logs containing the one or more admission requests associated with the new application installation in the empty namespace, wherein the empty namespace is the sandbox representative of the production environment, comprise:
program instructions to suspend the new application into the production environment.

14. The computer program product of claim 10, wherein the program instructions, stored on the one or more computer readable storage media, further comprise:
program instructions to implement the generated security policy into the production environment; and
program instructions to install the new application into the production environment.

15. A computer system comprising:
one or more computer processors;
one or more computer readable storage media; and
program instructions stored on the computer readable storage media for execution by at least one of the one or more processors, the stored program instructions comprising:
program instructions to collect logs containing one or more admission requests associated with a new application installation in an empty namespace, wherein the empty namespace is a sandbox representative of a production environment;
program instructions to classify the one or more admission requests according to a set of conditions indicating respective levels of trust;
program instructions to create a set of candidates for signing containing admissions requests that are classified unsigned; and
program instructions to generate a security policy for each candidate for signing in the set of candidates for signing.

16. The computer system of claim 15, wherein the program instructions stored, on the one or more computer readable storage media, further comprise:
program instructions to identify a request intent for each candidate for signing in the set of candidates for signing, wherein the request intent dictates whether the candidate for signing is the admission request for a resource creation or the admission request for a resource update.

17. The computer system of claim 16, wherein the program instructions, stored on the one or more computer readable storage media, further comprise:
program instructions to, responsive to identifying the request intent for the resource creation, identify a difference between information of the resource included in the candidate for signing and information of the resource created by the new application installation; and
program instructions to generate the security policy to exclude the difference.

18. The computer system of claim 16, wherein the program instructions, stored on the one or more computer readable storage media, further comprise:
program instructions to, responsive to identifying the request intent for the resource update, identify a difference between the resource before the resource update and after the resource after the resource update; and
program instructions to generate the security policy to allow the identified difference.

19. The computer system of claim 15, wherein the program instructions, collect to logs containing the one or more admission requests associated with the new application installation in the empty namespace, wherein the empty namespace is the sandbox representative of the production environment, comprise:
program instructions to suspend the new application into the production environment.

20. The computer system of claim 15, wherein the program instructions, stored on the one or more computer readable storage media, further comprise:
program instructions to implement the generated security policy into the production environment; and
program instructions to install the new application into the production environment.

* * * * *